United States Patent Office 3,663,597
Patented May 16, 1972

3,663,597
PROCESS FOR THE PURIFICATION OF CYCLANDELATE
David Flitter, Havertown, Pa., assignor to American Home Products Corporation, New York, N.Y.
No Drawing. Filed May 5, 1970, Ser. No. 34,894
Int. Cl. C07c 65/02
U.S. Cl. 260—473 A                   7 Claims

ABSTRACT OF THE DISCLOSURE

The amount of the impurity trimethylcyclohexylphenylglyoxylate formed in the preparation of cyclandelate by the reaction of 3,3,5-trimethylcyclohexanol and mandelic acid may be substantially reduced or eliminated by stirring crude cyclandelate in solution with an aqueous solution of sodium borohydride at temperatures ranging from 25 to 65° C. and a pH of 2.5 to 11.5. The amount of borohydride ranges from 0.5 to 2.0 percent by weight of the amount of cyclandelate present.

---

The present invention is directed to a process for removing impurities from cyclandelate and to a process for preventing the formation of the impurity trimethylcyclohexylphenylglyoxylate in the preparation of cyclandelate from 3,3,5 - trimethylcyclohexanol and mandelic acid.

Cyclandelate is the generic name for 3,3,5-trimethyl cyclohexanol-1 mandelate. The process for the preparation of cyclandelate is described in U.S. Patent 2,707,193. The process consists generally in the reaction of 3,3,5-trimethyl cyclohexanol and mandelic acid.

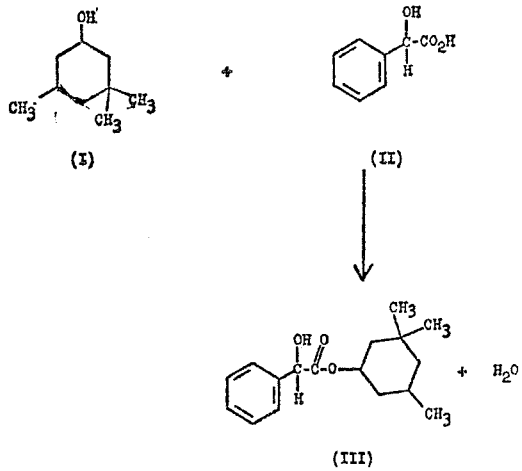

In the commercial process for making cyclandelate there is frequently produced the impurity trimethylcyclohexylphenylglyoxylate.

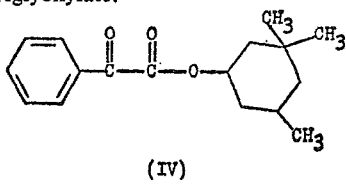

The impurity is objectionable because of its toxicity and its apparent accelerating effect on the deterioration of cyclandelate in storage.

The purity of cyclandelate is most conveniently and effectively measured by an ultraviolet spectrography. Even extremely small amounts of the impurity (IV) adversely affect the ultraviolet spectrum and cause material to be off grade.

Cyclandelate is used in pharmacology as a spasmolytic.

It is an object of the present invention to provide a method for purifying cyclandelate contaminated with trimethylcyclohexylphenylglyoxylate.

It is another object of the present invention to provide a process for the preparation of cyclandelate which eliminates or substantially reduces the impurity trimethylcyclohexylphenylglyoxylate.

It is a further object of the present invention to provide a therapeutically acceptable cyclandelate which has an increased shelf life.

It is a feature of the present invention that the process permits the processing of finished out-of-specification cyclandelate to afford an acceptable high quality material within specification limits. This was previously not possible to accomplish in the prior art because the usual purification steps of washing or redistillation either left the ultraviolet extinction coefficients unchanged or even increased them over previous values.

It has been found that crude cyclandelate may be purified by the following procedure. Crude cyclandelate is dissolved in a solvent chosen for convenience from the class of saturated hydrocarbons. The crude cyclandelate solution is stirred for a suitable interval, typically one to five hours, with an aqueous solution of sodium borohydride ($NaBH_4$) at temperatures ranging from 25 to 65° C. The preferred temperature range is 40 to 50° C. The pH of the solution may be adjusted to any desired level in the range between 2.5 to 11.5. The preferred pH range is 8.0 to 11.0 because at lower pH levels borohydride is unstable and decomposes rapidly. The amount of sodium borohydride used ranges from about 0.5 to 2.0 percent by weight of the amount of cyclandelate present.

At the end of the stirring period cyclandelate is recovered by well known procedures. For instance, the aqueous organic layers may be separated gravimetrically and the product organic layer washed with an appropriate solvent and then distilled.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims. For instance, any desired combination of time, temperature and pH may be employed within the limits described above which would achieve the desired effect of reducing the trimethylcyclohexylphenylglyoxylate content of the final product.

EXAMPLE I

A batch of cyclandelate was made using a mixture of hexane and heptane as reaction solvent. The crude reaction mixture was divided into two parts. One was washed several times with water to remove acid catalyst, then distilled to isolate the product. The other portion, in addition to the water washes, was stirred for 3 hours at pH 10.3 to 10.4 with 2 percent sodium borohydride (based on weight of cyclandelate present) at 45–52° C. After washing to remove unreacted sodium borohydride the product was distilled. The products were compared by means of determination of the ultraviolet extinction coefficients at 258 millimicrons ($m\mu$), for which the standard range is 7.3 to 8.6. For the portion not treated with sodium borohydride the coefficient was 8.1; for the borohydride portion the value was 7.5.

EXAMPLE II

A batch of material was prepared which had ultraviolet extinction coefficients shown in Table 1 which showed it to be off grade material, not useful in pharmacology.

TABLE 1.—ULTRAVIOLET EXTINCTION COEFFICIENTS OF STARTING MATERIAL

| Ultraviolet frequency, mµ | 252 | 258 | 264 |
|---|---|---|---|
| Extenction coefficient | 7.9 | 8.9 | 6.6 |
| FDA specification | 6.0–7.3 | 7.3–8.6 | 5.6–6.6 |

The quantity of 750 grams of the above was dissolved in warm cyclohexane (375 cubic centimeters), then stirred together with 800 cubic centimeters of tap water. The pH was adjusted to 10.3 and the temperature held at 45–55° C. Into this stirred mixture there was dropped 30 grams of sodium borohydride and the stirring continued for 3 hours. The layers were separated, product layer washed five times, then distilled. The product had the extinction coefficients shown in Table 2 which showed it to be acceptable material for use in pharmacology.

TABLE 2.—ULTRAVIOLET EXTINCTION COEFFICIENTS OF PRODUCT

| Ultraviolet frequency, mµ | 252 | 258 | 264 |
|---|---|---|---|
| Extinction coefficient | 6.3 | 7.6 | 5.6 |
| FDA specification | 6.0–7.3 | 7.3–8.6 | 5.6–6.6 |

The term and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process for the preparation of purified cyclandelate comprising (A) Heating dl-mandelic acid for about 1 to 10 hours at about 80 to about 160° C. with a mixture of cis and trans 3,3,5-trimethylcyclohexanol while passing dry hydrochloric acid gas through the mixture;
(B) Adjusting the pH of the reaction mixture between about 2.5 to 11.5; and
(C) Stirring an aqueous solution of sodium borohydride with the product for about 1 to 5 hours at a temperature from about 25 to 65° C.

2. A process as defined by claim 1 comprising stirring said product in solution with at least one saturated hydrocarbon solvent for a period of about 1 to about 5 hours with an aqueous solution of sodium borohydride at a temperature from about 25 to 65° C.

3. A process as described in claim 2 wherein the temperature range is about 40 to 50° C.

4. A process as described in claim 2 in which the amount of borohydride used is about 0.5 to 2.0 percent by weight of the amount of cyclandelate present.

5. A process as described in claim 2 in which the pH is in the range from about 2.5 to 11.5.

6. A process as described in claim 2 in which the pH is between about 8.0 and 11.0.

7. A process as defined in claim 2 wherein the hydrocarbon solvent is selected from the class consisting of hexane, heptane and a mixture thereof.

References Cited

FOREIGN PATENTS 707,227   4/1954   Great Britain _____ 260—473 A

LORRAINE A. WEINBERGER, Primary Examiner

J. F. TERAPANE, Assistant Examiner